US006846887B2

(12) United States Patent
Gray et al.

(10) Patent No.: US 6,846,887 B2
(45) Date of Patent: Jan. 25, 2005

(54) POLYOLEFIN CATALYSTS, PRODUCTION THEREOF AND METHOD OF USE

(75) Inventors: Steven D. Gray, League City, TX (US); Tim J. Coffy, Houston, TX (US); Edwar S. Shamshoum, Gibsonia, PA (US); Hong Chen, Atlanta, GA (US)

(73) Assignee: Fina Technology, Inc., Houston, TX (US)

( * ) Notice: Subject to any disclaimer, the term of this patent is extended or adjusted under 35 U.S.C. 154(b) by 0 days.

(21) Appl. No.: 10/370,365

(22) Filed: Feb. 18, 2003

(65) Prior Publication Data

US 2004/0162401 A1 Aug. 19, 2004

(Under 37 CFR 1.47)

(51) Int. Cl.⁷ ............................ C08F 4/654; C08F 4/655
(52) U.S. Cl. .................. 526/124.2; 526/75; 526/124.7; 526/123.1; 502/115; 502/132
(58) Field of Search ................................ 526/75, 124.2, 526/124.7, 123.1; 502/115, 132

(56) References Cited

U.S. PATENT DOCUMENTS

| 4,419,269 A | * | 12/1983 | Schell, Jr. | 502/115 |
| 4,767,735 A | | 8/1988 | Ewen et al. | 502/109 |
| 4,927,797 A | | 5/1990 | Ewen | 502/127 |
| 5,122,583 A | | 6/1992 | Ewen et al. | 526/125 |
| 5,155,187 A | * | 10/1992 | Shelly | 526/116 |
| 5,244,990 A | * | 9/1993 | Mitchell | 526/119 |
| 6,337,376 B1 | * | 1/2002 | Naito et al. | 526/124.1 |

* cited by examiner

*Primary Examiner*—Caixia Lu
(74) *Attorney, Agent, or Firm*—Madan, Mossman & Sriram, P.C.

(57) ABSTRACT

A method of modifying a Ziegler-Natta type polyolefin catalyst comprises contacting the Ziegler-Natta catalyst with olefin monomer to form a prepolymerized catalyst. The prepolymerized catalyst can comprise a reduced number of catalyst particles having a size of 40 microns or less. The prepolymerized catalyst can be used in a polymerization process to produce polymer fluff particles with a reduced number of polymer fluff fines than the Ziegler-Natta type catalyst.

11 Claims, 9 Drawing Sheets

Effect of Preactivation on Catalyst Particle Size Distribution

Effect of Concentration on BEM-Based Fluff PSD

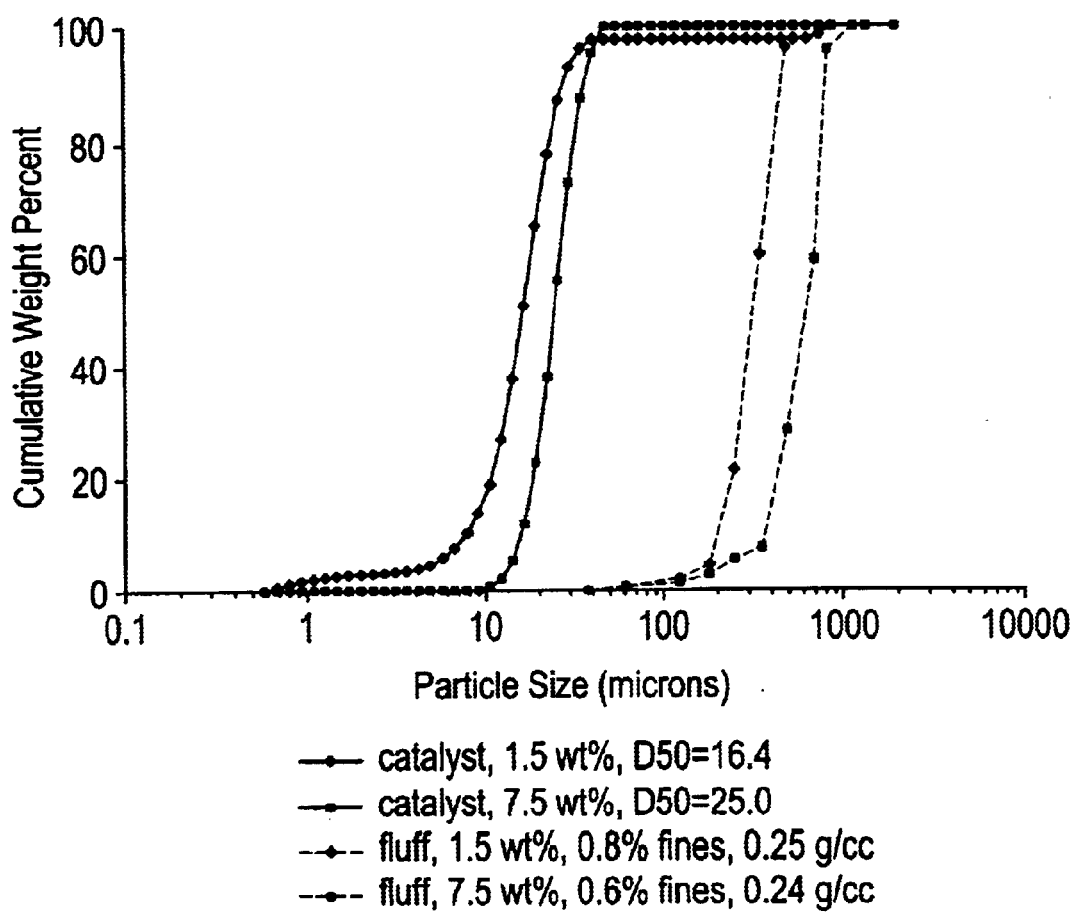

POLYOLEFIN CATALYSTS, PRODUCTION THEREOF AND METHOD OF USE

BACKGROUND OF THE INVENTION

1. Field of the Invention

The present invention relates to catalysts, methods of making catalysts, and processes for polymerizing polyolefins.

2. Description of the Related Art

Ziegler-Natta type polyolefin catalysts, their general methods of making, and subsequent use, are well known in the polymerization art. Typically, these systems include a Ziegler-Natta type polymerization catalyst component; a co-catalyst, usually an organoaluminum compound; and an electron donor compound. There are many issued patents relating to catalysts and catalyst systems designed primarily for the polymerization of propylene and ethylene that are known to those skilled in the art.

A Ziegler-Natta type polymerization catalyst is basically a complex derived from a halide of a transition metal, for example, titanium, chromium or vanadium, with a metal hydride and/or a metal alkyl that is typically an organoaluminum compound. The catalyst component is usually comprised of a titanium halide supported on a magnesium compound complexed with an alkylaluminum. While much is known about Ziegler-type catalysts, there is a constant search for improvements in their polymer yield, catalyst life, catalyst activity, powder size and shape (morphology), and in their ability to produce polyolefins having certain properties.

For example, it has been observed that some Ziegler-type catalysts can be quite unstable both prior to and during polymerization. This instability results in a breakdown of the catalyst and the formation of fine particles, and in turn, a formation of a large amount of polymer fines (particles less than $125\mu$). While these catalysts may originally posses a large particle size and a narrow particle size distribution, the catalyst can fragment upon mixing or upon polymerization, to provide a surprisingly large amount of polymer fine particles and a broad fluff particle size distribution curve. It has been observed that some catalysts gradually produced more fines upon standing. These observations suggested that a break down in the catalyst and the generation of fine catalyst particles could be occurring either prior to or during the polymerization process.

SUMMARY OF THE INVENTION

One embodiment of the present invention is a process for modifying a Ziegler-Natta type catalyst comprising providing a Ziegler-Natta type catalyst and contacting the catalyst with olefin monomer to form a prepolymerized catalyst. The Ziegler-Natta type catalyst can be prepared using a magnesium precursor and an organometallic compound.

Another embodiment of the invention is a polymerization process comprising: providing a Ziegler-Natta type catalyst; contacting the Ziegler-Natta type catalyst with olefin monomer to form a prepolymerized catalyst; and contacting the prepolymerized catalyst with olefin monomer under polymerization reaction conditions to produce polymer fluff particles. The prepolymerized catalyst can be capable of producing a reduced number of fines than the Ziegler-Natta type catalyst.

Yet another embodiment is a process for altering a Ziegler-Natta type catalyst particle size comprising preparing a Ziegler-Natta type catalyst using a magnesium precursor solution having a magnesium solution concentration wherein the catalyst particle size increases with an increase in magnesium solution concentration. The Ziegler-Natta type catalyst can be made using a magnesium precursor chosen from the group consisting of dibutylmagnesium and butylethylmagnesium. The resulting catalyst particle size can be increased from between about 3 to about 10% for each solution concentration multiple that is utilized, when the solution concentration ranges are between about 10 mmol Mg/L to about 250 mmol Mg/L.

Another embodiment of the invention is a polymerization process comprising preparing a Ziegler-Natta type catalyst using a magnesium precursor solution having a magnesium solution concentration, wherein the catalyst particle size increases with an increase in magnesium solution concentration. The catalyst is contacted with olefin monomer under polymerization reaction conditions to produce polymer fluff particles. The process can further comprise contacting the catalyst with olefin monomer to form a prepolymerized catalyst. The number of polymer fluff particles less than 125 microns can decrease with an increase in magnesium solution concentration used.

Yet another embodiment of the invention is a polymerization process comprising providing a Ziegler-Natta type catalyst and contacting the Ziegler-Natta type catalyst with triisobutylaluminum to form a precontacted catalyst. The precontacted catalyst is then contacted with olefin monomer to form a prepolymerized catalyst. The prepolymerized catalyst is contacted with olefin monomer under polymerization reaction conditions to produce polymer fluff particles. The precontacted catalyst is at least 20% larger in average particle size than the Ziegler-Natta type catalyst and the prepolymerized catalyst has at least 50% fewer particles with a size of 40 microns or less than the precontacted catalyst. Less than 5% of the polymer fluff particles are 700 microns or less in size and the number of polymer fines produced is less than 0.5%.

BRIEF DESCRIPTION OF THE DRAWINGS

FIG. 9 is a graph illustrating the effects of concentration on DBM based catalysts on both catalyst and polymer fluff particle size distributions.

DETAILED DESCRIPTION OF THE INVENTION

Figure 1:
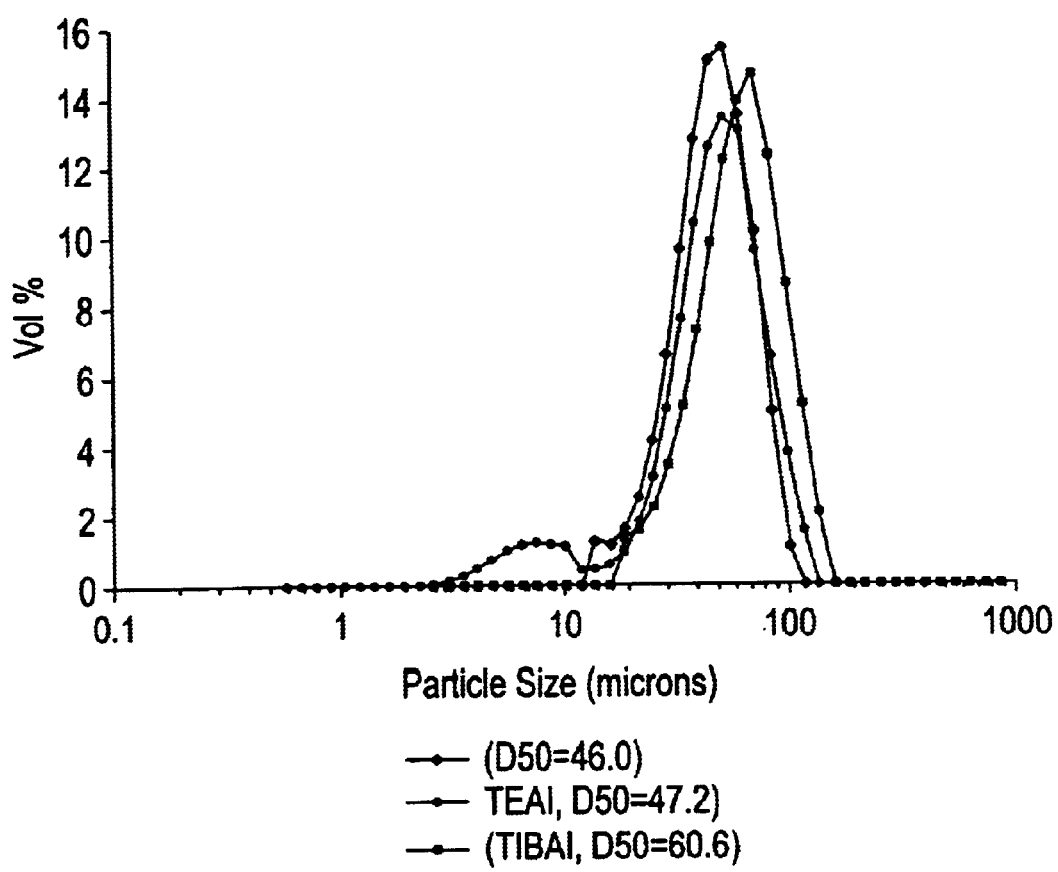
FIG. 1 is a graph illustrating the effect of preactivation on catalyst particle size distribution.

The present invention may be utilized in the modification of any suitable Ziegler-Natta type polyolefin catalyst. As used herein, a "Ziegler-Natta" type polyolefin catalyst is basically a complex derived from a halide of a transition metal, for example, titanium, chromium or vanadium, with a metal hydride and/or a metal alkyl that is typically an organoaluminum compound. The catalyst component is typically comprised of a titanium halide supported on a magnesium compound complexed with an alkylaluminum.

Any of the conventional supported Ziegler-Natta transition metal compound catalyst components can be used in the present invention. The transition metal compound can be of the general formula $MR_x$ where M is the metal, R is a halogen or a hydrocarbyloxy and can be the same or different, and x is the valence of the metal. M can be a Group IVB, VB or VIB metal, and can be titanium. R can be a halogen, an alkoxy or a phenoxy. Illustrative examples of the transition metal compounds are $TiCl_4$, $TiBr_4$, $Ti(OC_2H_5)_3Cl$, $Ti(OC_2H_5)_3Cl$, $Ti(OC_3H_7)_2Cl_2$, $TiO(C_6H_{13})_2Cl_2$, $Ti(OC_2H_5)_2Br_2$ and $Ti(OC_{12}H_{25})Cl_3$. Mixtures of the transition metal compounds may be used. No restriction on the number of transition metal compounds is made as long as at least one transition metal compound is present.

The support can be an inert solid that is chemically unreactive with any of the components of the conventional Ziegler-Natta Catalyst, such as a magnesium compound. Examples of magnesium compounds that can be used to provide a support source for the catalyst components are magnesium halides, dialkoxymagnesiums, alkoxymagnesium halides, magnesium oxyhalides, dialkylmagnesiums, magnesium oxide, magnesium hydroxide, and carboxylates of magnesium.

The co-catalyst used in the present invention can be an organometallic compound of Group Ia, IIa, and IIIa metals such as aluminum alkyls, aluminum alkyl hydrides, lithium aluminum alkyls, zinc alkyls, magnesium alkyls and the like. Organometallic compounds employed in the practice of the present invention can be trialkylaluminum co-catalysts. More specifically, the trialkylaluminums can have the formula $AlR_3$ where R is an alkyl having 1–8 carbon atoms, R being the same or different. Examples of aluminum alkyls are trimethylaluminum (TMA), triethylaluminum (TEAl) and triisobutylaluminum (TIBAl).

The term DEAC in the present application is used to represent diethylaluminumchloride ($Et_2AlCl$). Other compounds of the general formula $R_2AlCl$, where R is an alkyl or aryl, can also be used.

The term DIAE in the present application is used to represent diisoamylether. Other compounds of the formula ROR, where R is an alkyl, can also be used.

The magnesium precursors utilized in this study comprised dibutylmagnesium (DBM) and butylethylmagnesium (BEM). Other compounds having the general formula $MgR_2$, (wherein R=alkyl or aryl) can also be used.

In studies of a particular catalyst, produced as described below, it was found that the original catalyst is quite unstable both prior to polymerization and during the polymerization process. This instablilty results in a breakdown of the catalyst and the formation of small catalyst particles, such as for example catalyst particles that are twenty microns or less in size.

Reaction Synthesis 1

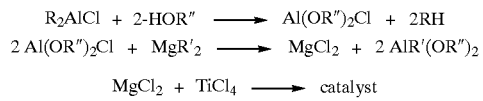

where R, R' and R" are each independently hyrocarbyl or substituted hydrocarbyl moieties having 1–20 carbon atoms and may be the same or different from each other.

While the above catalyst originally can have a large particle size and a narrow particle size distribution, it was observed that the catalyst could rapidly fragment upon mixing. Also upon polymerization, a surprisingly large amountof polymerfine particles (particles less than 125 microns) and a broad fluff particle size distribution curve were obtained.

It was also observed that samples of the catalyst gradually produced more fines upon standing. In one instance, a batch of catalyst that was found to initially give 4.2% fines was seen to provide over 10% fines upon standing under nitrogen for one week. These observations suggested that a break down in the catalyst and the generation of fine catalyst particles was occurring either prior to or during the polymerization process. It was found that by modifying the catalyst preparation methods, this destructive process can be reduced and a catalyst with improved integrity generated.

According to one embodiment of the present invention, a Ziegler-Natta type catalyst may be precontacted (alternatively referred to as preactivated) with an organometallic compound, typically an aluminum alkyl, to improve the catalyst integrity. In order to combat the instability problems mentioned above, several attempts to stabilize the catalyst by treating it with aluminum alkyls were made. The reaction synthesis used is as follows:

Reaction Synthesis 2

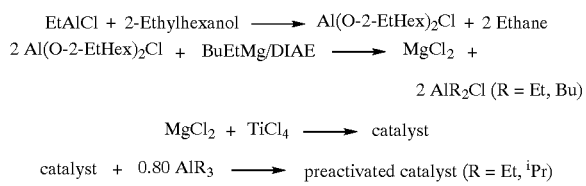

The preactivation was performed with both TEAl (Example 5) and TIBAl (Example 6). A ratio of approximately 0.8 Al/Ti was employed in the preactivation studies.

FIG. 1 graphically illustrates the effect of preactivation of the catalyst, showing the catalyst particle size distribution for the catalyst prior to preactivation, and after preactivation using TEAl and TIBAl As shown in FIG. 1, TEAl preactivation appears to result in a fragmentation of the catalyst particles, which is seen by the small amount of tailing into the sub-ten micron region of the curve. Nevertheless, an increase in the catalyst $D_{50}$ (from 40.0 to 47.2 microns) of 18% is seen upon TEAl preactivation. The effect of TIBAl preactivation on the catalyst particle size is also shown in FIG. 1. Here, a substantial increase in the catalyst particle size is observed as $D_{50}$ moves from 46.0 to 60.6 microns, an increase of over 30%. Unlike the results of the TEAl preactivation, no tailing into the low micron region of the curve is seen upon treatment with TIBAl. A reduction of approximately 66% in the amount of sub-twenty micron particles was observed as compared to the untreated catalyst. It is expected that decreases in the amount of sub-twenty micron particles in the range of 30 to 90% would normally occur with TIBAl preactivation, with decreases of up to 95% possible.

Figure 2:
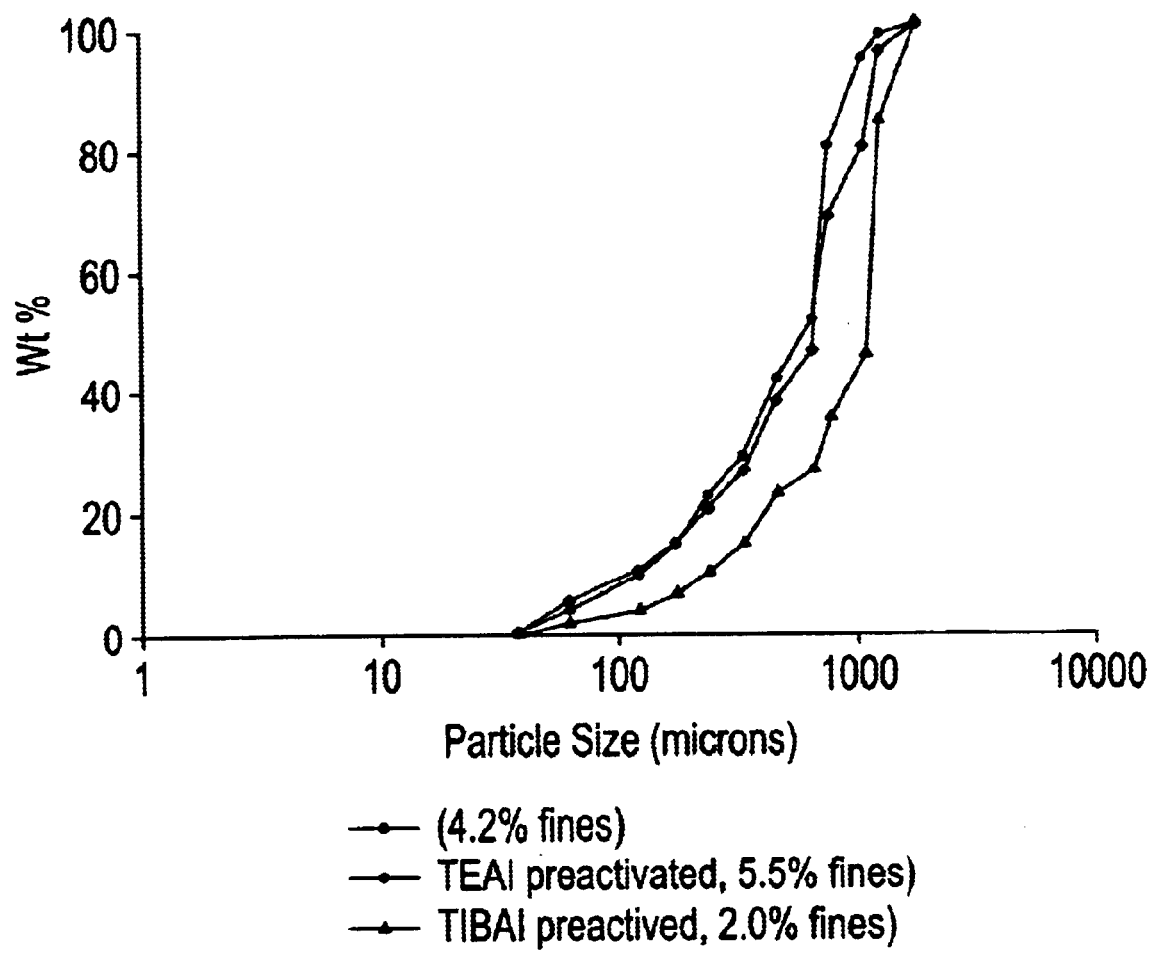
FIG. 2 is a graph illustrating the effect of preactivation on polymer fluff particle size distribution.

The particle size distributions for the polymer fluff produced by the TEAl and TIBAl preactivated catalysts are shown in FIG. 2. Included for comparison is data for polymer fluff produced by a catalyst prior to any preactivation process. In general, the overall fluff particle size distribution range is not significantly changed in either case. However, it is seen that the number of polymer fines given by the catalyst increases from 4.2% to 5.5% upon preactivation with TEAl. This may be a reflection of the catalyst breakdown upon preactivation with TEAl as evidenced by the tailing seen in the catalyst particle size distribution.

Conversely, TIBAl preactivation acts to reduce the number of polymer fines given by the catalyst. Initially the catalyst gave 4.2% fines, while the TIBAl preactivated catalyst gave only 2.0% fines, even upon standing for two weeks, a decrease in excess of 50%. Thus preactivation with TIBAl appears to stabilize the catalyst. Additionally, the fluff particle size distribution for the TIBAl preactivated catalyst has a $D_{50}$ of approximately 1100 microns, which is 37.5% larger than that given by the catalyst prior to preactivation (approximately 800 microns). FIG. 2 shows that in the case of TIBAl preactivation, except for the end points, the polymer fluff particles are increased in size throughout the entire particle size distribution range, as compared with either the catalyst prior to preactivation or catalyst preactivated with TEAL. The increase in polymer fluff size may be reflective of the increase of the catalyst particle size upon preactivation. The increase in particle size of the TIBAl preactivated catalyst, in comparison to the catalyst prior to preactivation or the catalyst preactivated with TEAL, may also act to reduce polymer fine generation. The preactivation was found to have no significant affect on the bulk density of the polymer or the polymer appearance.

The preactivation of the catalyst is generally carried out at a temperature in the range of about −20 to about 120° C., typically is done in the range of about 0 to about 80° C., and can be performed in the range of about 15 to about 35° C. The preactivation of the catalyst is generally carried out for a period of time in the range of about 0.1 to about 48 hours, typically is done in the range of about 0.5 to about 24 h, and can be performed in the range of about 0.5 to about 4 h. The preactivation of the catalyst is generally carried out with a molar ratio of magnesium precursor to aluminum alkyl in the range of about 0.01 to about 1, typically is done in the range of about 0.01 to about 0.1 and can be performed in the range of about 0.02 to about 0.05.

According to another embodiment of the present invention, the Ziegler-Natta catalyst may be pre-polymerized to improve the performance of the catalyst. Generally, a prepolymerization process is initiated by contacting a small amount of olefin monomer with the catalyst after the catalyst has been contacted with an electron donor. A pre-polymerization process is described in U.S. Pat. Nos. 4,767,735, 4,927,797 and 5,122,583, hereby incorporated by reference.

Figure 3:
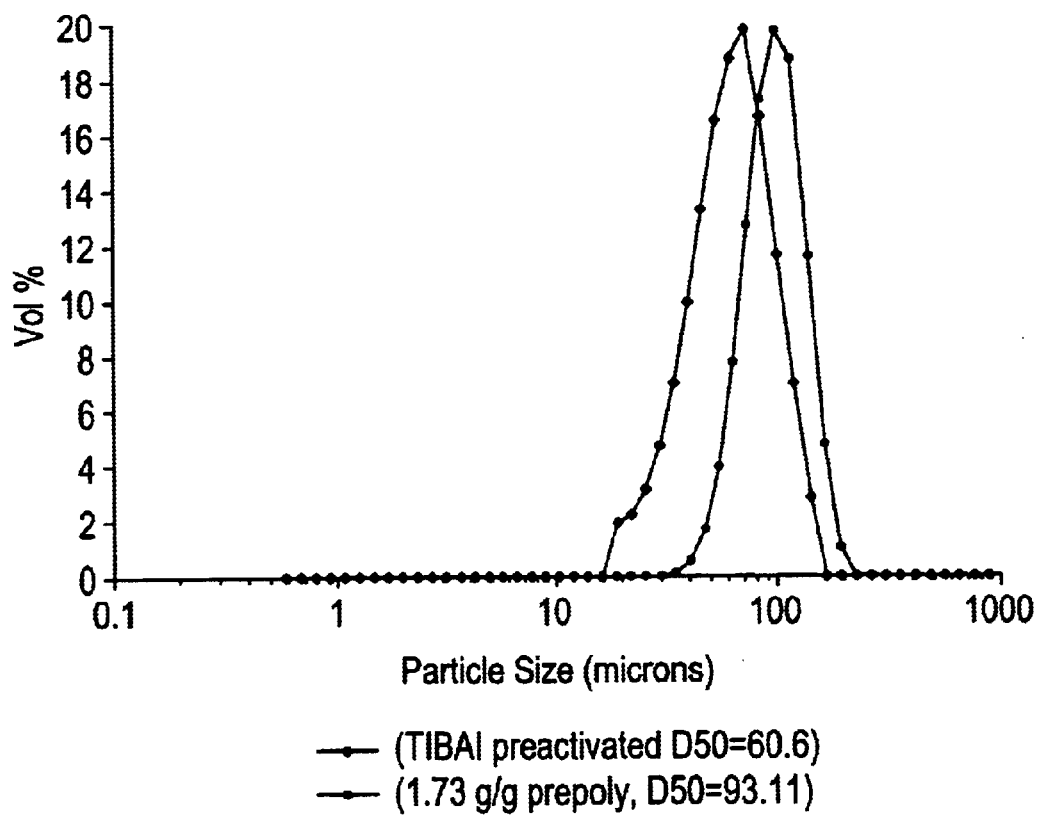
FIG. 3 is a graph illustrating the effect of prepolymerization on catalyst particle size distribution.

In order to further increase the stability of the catalyst during polymerization, a prepolymerization experiment was performed on the TIBAl preactivated catalyst. Thus a 1.7 g PE/g catalyst prepolymerization was performed. FIG. 3 shows the catalyst particle size distribution for the preactivated catalyst before (Example 6) and after prepolymerization (Example 7). There is a large increase in the catalyst particle size upon prepolymerization and the D50 particle size for the prepolymerized catalyst increased from 60.6 to 93.1 microns, an increase of over 50%. The prepolymerization results in decreasing the quantity of catalyst particles having a size of 40 microns or less from about 9.5% to about 0.5%, for a 95% reduction. Reductions in the range of 50% to 100% would be expected, thereby producing a prepolymerized catalyst having less than 5% particles having a size of 40 microns or less. The number of catalyst particles 30 microns or less in size is reduced from about 7% to virtually zero by means of the prepolymerization step.

Figure 4:
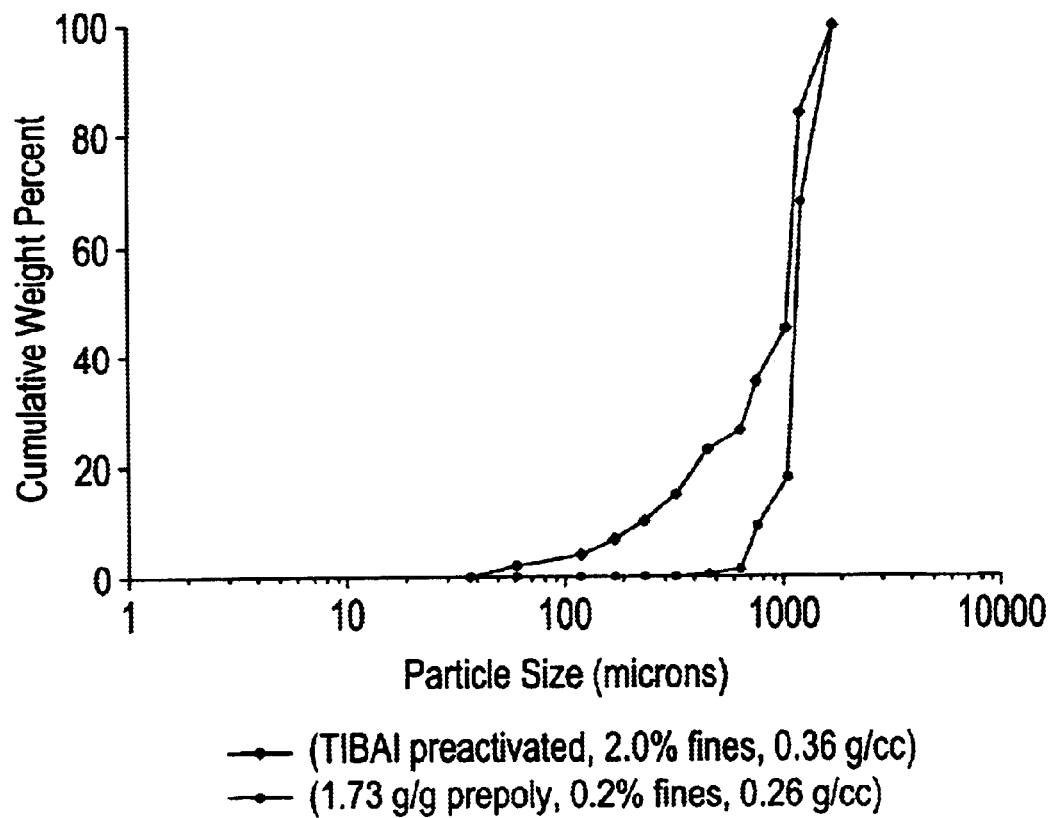
FIG. 4 is a graph illustrating the effect of prepolymerization on polymer fluff particle size distribution.

The polymer fluff produced by the prepolymerized catalyst has a particle size curve shown in FIG. 4. While the fluff $D_{50}$ is similar to that obtained using the catalyst prior to prepolymerization, the overall shapes of the curves are quite different. Whereas the preactivated catalyst fluff spans a broad range of particle sizes, the prepolymerized catalyst has a much tighter particle distribution. This is mainly due to a decrease in the number of polymer particles below 850 microns. FIG. 4 shows that polymer fluff particles of less than 850 microns make up less than 10% when the prepolymerized catalyst is used, as opposed to approximately 35% when the preactivated catalyst is used, a reduction of approximately 70%. Reductions in the range of 50 to 90% are to be expected. Polymer particles of less than 700 microns make up approximately 1% when the prepolymerized catalyst is used, as opposed to approximately 25% when the preactivated catalyst is used, a reduction of approximately 96%. It is expected that the prepolymerized catalyst can routinely produce polymer wherein less than 5% of the polymer fluff is smaller than 700 microns in size.

The amount of polymer fines produced by the catalyst is found to be reduced upon prepolymerization. Thus, the prepolymerized sample gave only 0.2% fines compared to 2.0% for the catalyst prior to prepolymerization, a reduction of 90%. It is expected that decreases in the number of fines in the range of 50 to 95% would typically occur with TIBAl preactivated prepolymerized catalyst. Decreases in the number of fines of from 75 to 98% are likely, with decreases of up to 99.9% possible. It is expected that the TIBAl preactivated prepolymerized catalyst can produce polymer with the amount of fines between 0.5 and 0.1%, with fine levels as low as 0.01% possible. Additionally, the prepolymerized fluff was found to be more uniform in terms of size and shape as compared to fluff from the catalyst prior to prepolymerization.

Another embodiment of the present invention includes the use of an increased magnesium solution concentration in the preparation of the Ziegler-Natta catalyst. In order to study this effect, the synthesis of the DBM and BEM based catalysts were carried out at five-times their original concentration (from 27 mmol Mg/L, 1.5 weight % to 135 Mg mmol/L, 7.5 weight %).

Figure 5:
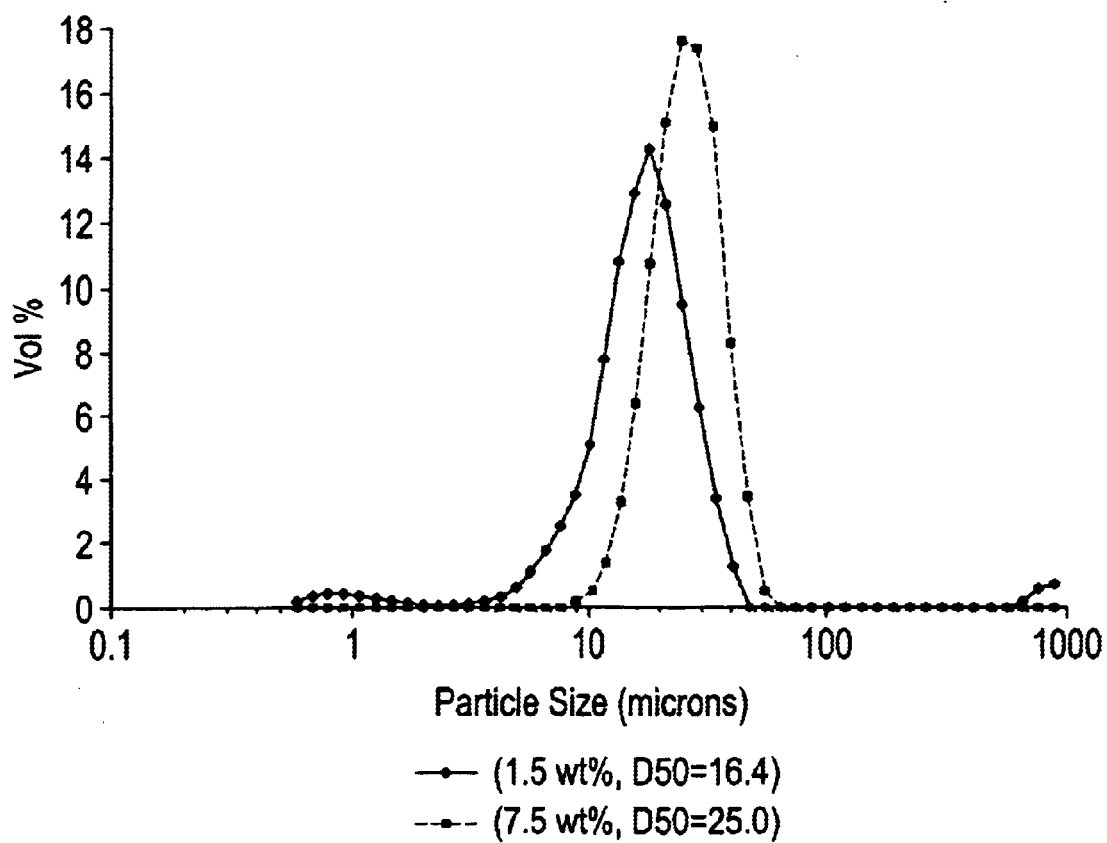
FIG. 5 is a graph illustrating the effect of concentration on DBM based catalyst particle size distribution.
Figure 6:
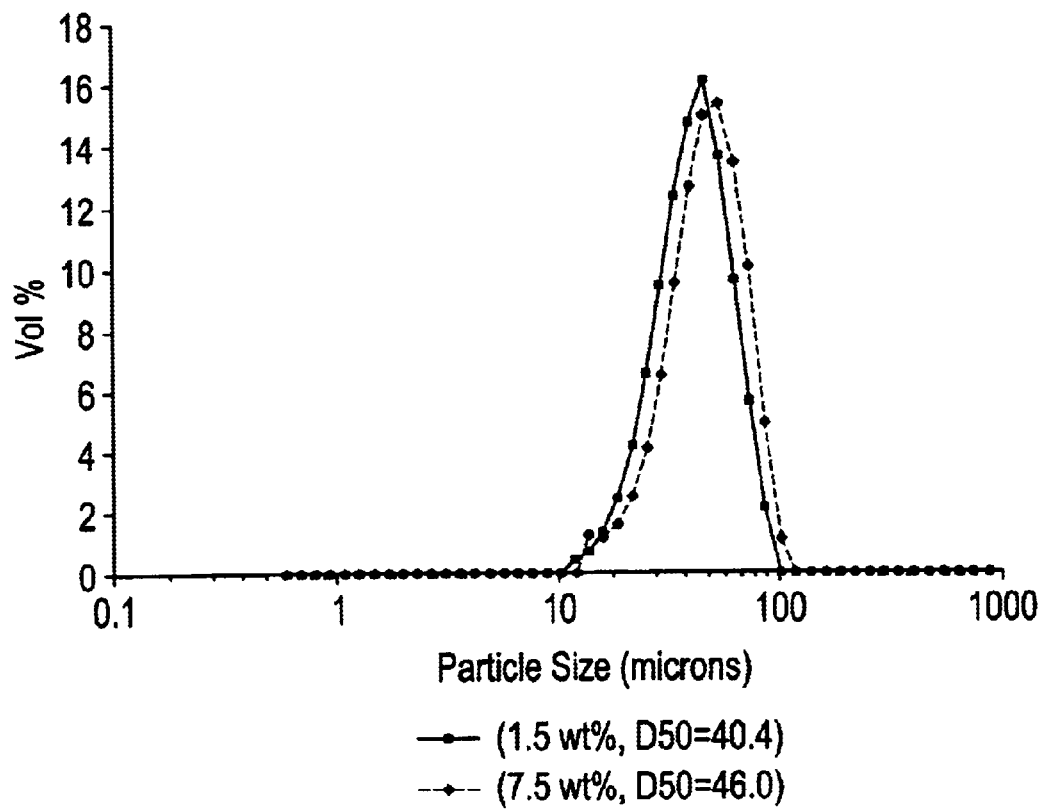
FIG. 6 is a graph illustrating the effect of concentration on BEM based catalyst particle size distribution.

Particle size data for DBM (Example 3) and BEM (Example 4) based catalysts prepared under concentrated slurry conditions are provided in Table 1. Particle size curves for these DBM and BEM catalysts appear in FIG. 5 and FIG. 6, respectively. For comparison, data for the catalysts prepared at the low slurry concentration are also included. As shown by this data, the catalyst particle size is found to increase with increasing slurry concentration.

For the DBM-based catalyst, a large increase in the catalyst particle size is seen upon increasing slurry concentration, having an increase in $D_{50}$ value from 16.4% to 25.0%, an increase of approximately 50%. In this particular example a five fold increase in concentration resulted in a 50% increase in catalyst size. A moderate increase is also observed for the BEM-based catalyst upon increasing synthesis concentration by five fold, resulting in an increase of about 15% in catalyst size.

TABLE 1

Catalyst Particle Size Data

| Catalyst | Mg source | mmol Mg/L | $D_{50}$ (mm) | $D_{10}$ (mm) | $D_{90}$ (mm) |
| --- | --- | --- | --- | --- | --- |
| Example 1 | DBM | 27 | 16.4 | 7.6 | 27.7 |
| Example 3 | DBM | 135 | 25.0 | 16.0 | 36.9 |

TABLE 1-continued

Catalyst Particle Size Data

| Catalyst | Mg source | mmol Mg/L | $D_{50}$ (mm) | $D_{10}$ (mm) | $D_{90}$ (mm) |
|---|---|---|---|---|---|
| Example 2 | BEM | 27 | 40.4 | 22.9 | 63.1 |
| Example 4 | BEM | 135 | 46.0 | 25.4 | 71.5 |

Figure 7:
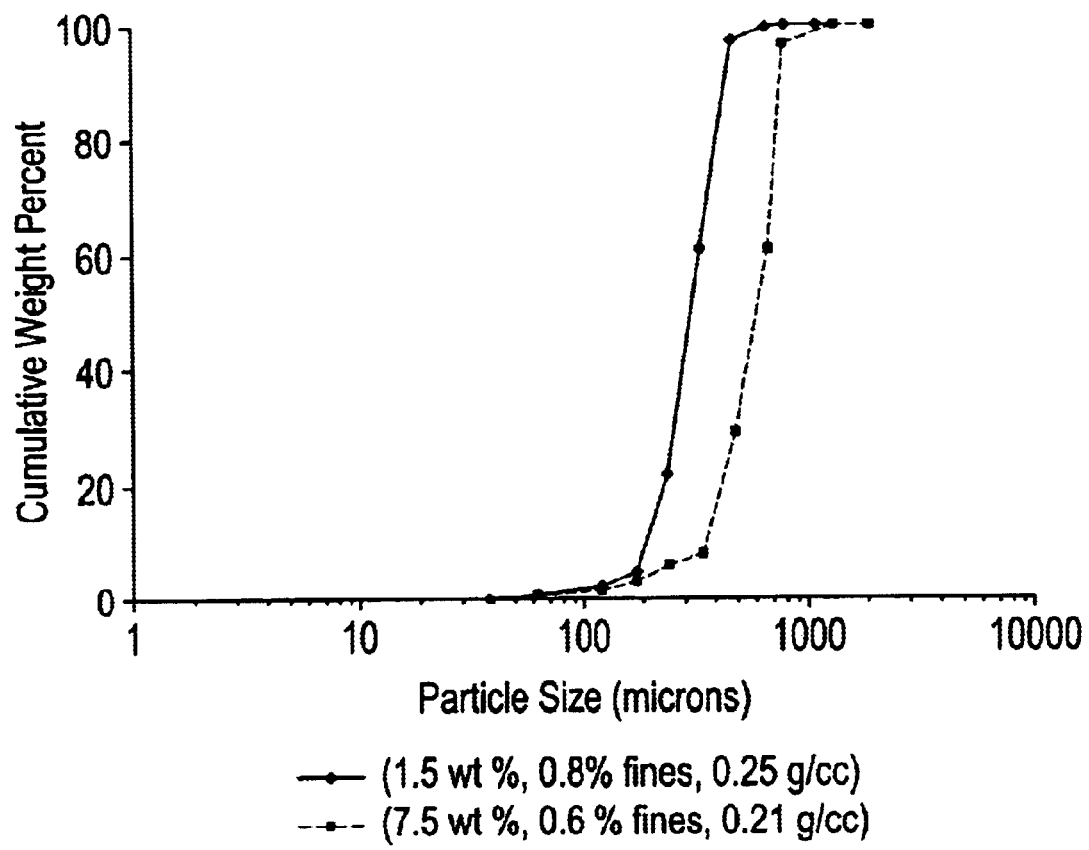
FIG. 7 is a graph illustrating the effect of concentration on DBM based polymer fluff particle size distribution.
Figure 8:
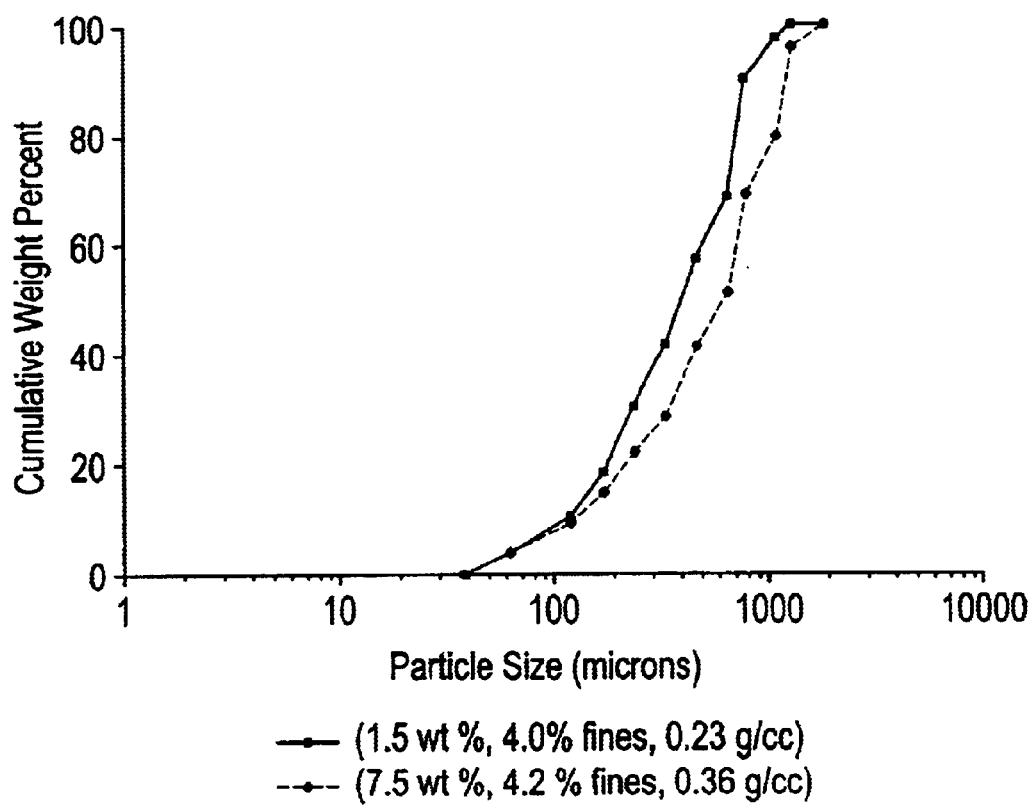
FIG. 8 is a graph illustrating the effect of concentration on BEM based polymer fluff particle size distribution.

FIG. 7 and FIG. 8 show the fluff particle size distribution for the DBM and BEM catalysts, respectively, comparing fluff particle size distributions at the higher and lower concentrations. As is shown in FIG. 7, the DBM-based catalyst prepared at high concentrations results in an increase in fluff particle size and the amount of fines is very low (0.6%). Overall, the curve compares well with that given by the DBM-based catalyst prepared at low concentrations, which also gave a very low amount of fines (0.8%). The particle size distribution curve for both high and low concentrations of DBM-based catalyst results in a relatively narrow width curve.

The polymer fluff particle size distribution reflects the increase seen in the catalyst particle size data moving from low to high catalyst preparation concentration. This replication effect is best shown by FIG. 9 (a combination of FIG. 5 and FIG. 7). The fluff particle size distribution for the BEM-based catalyst prepared at high concentrations also reflects an increase in the catalyst particle size (FIG. 8). The number of fines in the BEM-based catalyst at the higher concentration is found to be 4.2%, a value similar to that seen for the BEM-based catalyst prepared at the lower concentration (4.0%).

Fluff bulk density for the polymers produced by the DBM and BEM derived catalysts are given in Table 2. A significant increase in fluff bulk density is seen in the BEM based catalyst at high synthesis slurry concentration (0.36 g/cc) compared to the BEM based catalyst at low synthesis slurry concentration (0.22 g/cc). Thus for the BEM-based catalyst, there appears to be a correlation between the catalyst synthesis slurry concentration and the fluff bulk density. A similar effect is not exhibited by the DBM-based catalyst. The DBM-based catalysts prepared at low and high slurry concentrations provide fluff with similar, low bulk densities. Visually, the DBM high concentration fluff appeared to have the same morphology as the DBM low concentration fluff. Microscopically, the DBM high concentration fluff appeared slightly more granular than the cauliflower-like shape of the DBM low concentration fluff. The BEM low concentration fluff looked very similar to the DBM high concentration fluff both visually and under a microscope. The lone high bulk density fluff, that produced by the BEM high concentration catalyst, had a very granular appearance under a microscope and was much less popcorn-like than the BEM low concentration catalyst fluff.

TABLE 2

Fluff Bulk Density Data

| CATALYST | Mg source | mmol Mg/L | Bulk Density (g/cc) |
|---|---|---|---|
| Example 1 | DBM | 27 | 0.25 |
| Example 3 | DBM | 135 | 0.24 |
| Example 2 | BEM | 27 | 0.23 |
| Example 4 | BEM | 135 | 0.36 |

The catalysts of the present invention can be used for the polymerization of α-olefins. For example, the present catalyst is useful for catalyzing ethylene, propylene, butylene, pentene, hexene, 4-methylpentene and other α-alkenes having at least 2 carbon atoms, and also for mixtures thereof. The catalysts of the present invention can be utilized in the polymerization of propylene to produce polypropylene, for example, isotactic polypropylene.

Olefin polymerization methods utilizing a Ziegler-Natta type of catalyst are well known in general, and any suitable method may be utilized with the catalysts of the present invention.

EXAMPLES

The following examples are provided merely to illustrate a few embodiments of the present invention and are not intended to limit the present invention or the claims of the present invention.

General Procedures

All manipulations were performed under an inert atmosphere of Argon or Nitrogen using standard Schlenk-line and drybox techniques. Catalyst particle size data was performed on the Malvern Mastersizer using catalyst slurry samples taken at various stages of the catalyst preparation. Fluff particle size data were obtained by sieving analyses using a CSC Scientific Sieve Shaker.

Raw Materials

Heptane solutions of DBM (1 M), BEM (15.5%), DEAC (diethyl aluminum chloride) (25.1%), TEAl (24.8%), and TIBAl (24%) were purchased from Akzo and were used as received. 2-Ethyl-hexanol and DIAE (diisoamylether) were purchased from Aldrich, degassed with Argon, and dried with 5 A molecular sieves prior to use. $TiCl_4$ and $Ti(OBu)_4$ were purchased from Aldrich and were used as received. Heptane was purified by passing it at a rate of 12 mL/min through a column of 3 A molecular sieves, a F200 alumina column, and finally a column filled with BASF R3-11 copper catalyst.

SUMMARY OF EXAMPLES

The examples utilized a controlled morphology Ziegler-Natta type catalyst with general catalyst synthesis as shown below:

$$AlEt_2Cl + 2\text{-EtHexOH} \longrightarrow Al(OR)_2Cl + 2 C_2H_6$$
$$2 Al(OR)_2Cl + 2 R'_2Mg/DIAE \longrightarrow 2 Al(OR)_2R + MgCl_2$$
$$MgCl_2 + TiCl_4 \longrightarrow \text{catalyst}$$
$$(R = 2\text{-Et-Hexyl}, R' = \text{Et or Bu})$$

The initial preparation of the catalyst employed dibutylmagnesium (DBM) and the catalyst prepared with this magnesium source will be referred to as DBM-Based. A slight modification of the preparation of the catalyst is where butylethylmagnesium (BEM) is used in place of DBM in the catalyst synthesis. This catalyst will be referred to as BEM-Based. Data for these catalysts is given in Table 3.

TABLE 3

Data for Catalyst

| | Catalyst $D_{50}$ | Productivity g/g/h | % Fines | Fluff Bulk Density g/cc |
|---|---|---|---|---|
| DBM | ca. 25 μ | 16,000–24,000 | <2.0% | 0.20–0.26 |
| BEM | >40 μ | 4,000–8,000 | <1.0% | 0.28–0.32 |

Both DBM and BEM based catalysts have been prepared and evaluated for catalyst particle size, fluff particle size distribution, percent fines, and catalyst activity.

Various modifications of the catalyst system have been investigated, including preactivation of the catalyst with TEAl and TIBAl, and prepolymerization. The catalysts described in this report are summarized in Table 4.

TABLE 4

Summary of Example Catalysts

| Reaction | Mg-Source | mmol Mg/L | Modification |
|---|---|---|---|
| Example 1 | DBM | 27 | none |
| Example 2 | BEM | 27 | none |
| Example 3 | DBM | 135 | none |
| Example 4 | BEM | 135 | none |
| Example 5 | BEM | 27 | TEAI preactivation |
| Example 6 | BEM | 135 | TIBAI preactivation |
| Example 7 | BEM | 135 | prepolymerization |

Example 1

Preparation of DBM-Based Catalyst at Low Slurry Concentration

In a purge box, DEAC (24.11 g, 50 mmol) was weighed into a 50 mL graduated cylinder. This solution was transferred to an argon-filled 500 mL, three-necked flask equipped with a 125 mL addition funnel, a thermometer and a septum. The graduated cylinder used to measure the DEAC was rinsed with heptane (2×25 mL) and the solution was magnetically stirred.

In a purge box, 2-Ethyl-hexanol (13.02 g, 100 mmol) was weighed in to a 100 mL graduated cylinder. This solution was diluted with 40 mL of heptane and added to the addition funnel of the three-necked 500 mL flask containing the DEAC. The 2-Ethyl-hexanol solution was next added dropwise to the DEAC solution. Fuming and gas evolution was observed and the temperature of the solution rapidly reached 55–60° C. The total addition took 15 minutes. The resultant clear solution was allowed to stir for 2 h at room temperature.

In a purgebox, DBM (19.25 g, 27 mmol) was weighed into a 50 mL graduated cylinder. This solution was transferred to an argon-filled, five-neck flask equipped with a 125 mL addition funnel, a thermometer, a mechanical stirrer with a Teflon paddle, a condenser with a gas inlet, and a septum. The graduated cylinder used to measure the DBM was rinsed with heptane (2×45 mL). The agitation in the flask was set to 200 rpm. A solution of DIAE (2.21 g, 14 mmol) in heptane (10 mL) was added to the addition funnel. The DIAE was next added to the DBM solution dropwise over the course of 10 min. A decrease in the viscosity of the DBM solution was seen upon DIAE addition. The addition funnel was rinsed with heptane (2×10 mL)

After 2 h, the DEAC/2-Et-hexanol mixture was transferred to the addition funnel of the five-necked flask and the solution was added dropwise to the DBM/DIAE solution at a rate of about 1.5 drops/sec. No immediate changes were seen upon addition. After approximately 40 mL of the DEAC/2-Et-hexanol solution were added, the solution became cloudy with the formation of a white precipitate. The addition was complete in 55 min and the addition funnel was rinsed with heptane (20 mL). Gradually, a large amount of white solid was seen to form. The reaction was allowed to stir at 200 rpm.

After 1 h, the solution was gradually heated to reflux (98° C.) over the course of 25 min. As the solution was heated, additional white solid was seen to form. After 2 h, the solution was cooled to 75° C. and the agitation was discontinued. Settling of the solid was rapid, but the solution maintained a cloudy appearance. The solution was allowed to stand at this temperature overnight.

After 14 h, heating was discontinued. The supernatant was clear at this point. Once the solution had cooled to 50° C., the supernatant was decanted. The resultant white solid was slurried in heptane (250 mL) and the solution was agitated at 200 rpm. After 5 min., stirring was discontinued and the solution was allowed to settle. Settling was rapid and after 5 min, the clear supernatant was again decanted. This washing procedure was repeated till the solid had been washed a total of 4 times. The resultant white solid was reslurried in heptane (250 mL) and allowed to cool to room temperature.

Agitation in the 1 L flask was set to 200 rpm and a solution of $TiCl_4$ (11.83 g, 60 mmol) dissolved in heptane (90 mL) was added to the addition funnel. The $TiCl_4$ solution was added dropwise to the solution. No immediate changes were seen. After 15 minutes, a slight yellowing of the solution was seen. The addition was complete in 45 minutes. At this point, the solution had a gel-like appearance. The mixture was allowed to stir at room temperature for one hour. Next, the temperature was slowly increased to 50° C. over the course of 15 minutes. A slight darkening of the solution was observed and the solid appeared to grow less gel-like and more crystalline upon heating. After 1 h, the temperature was gradually increased to 98° C. over the course of 20 minutes. Over time, a darkening of the slurry was seen and after 1.5 h, the slurry appeared tan in color. After 2 h, the temperature was reduced to 50° C. and agitation was discontinued. Settling of the light tan solid was rapid (less than five minutes). The clear supernatant was decanted and the solid was reslurried in heptane (250 mL). The slurry was agitated for 10 minutes at 200 rpm. The washing procedure described above was performed a total of 4 times. The solid appeared to get slightly darker upon each washing. The final solid was reslurried in heptane (250 mL) and a slurry sample was taken for polymerization studies and particle sizing.

The supernatant was removed from the reaction to provide a light tan solid. This wet solid was vacuum dried at 50° C. for 2 h to afford 2.80 g of an off-white solid.

Example 2

Preparation of BEM-Based Catalyst at Low Slurry Concentration

The exact procedure employed in the preparation of the DBM-Based Catalyst catalyst described above was performed except that BEM was used in place of DBM in the synthesis. The observation for both reactions are similar except those noted below. First, in the heat treatment step after the DEAC/2-Et-hexanol mixture is added to the BEM/DIAE solution, the formation of a very crystalline solid is seen to form after about 15 minutes at reflux. Secondly after adding $TiCl_4$ to the mixture and heating it to 50° C., the formation of some large, chalk-like particles which eventually broke up was observed. Finally, the settling of the BEM-based catalyst catalyst was slightly faster than the settling of the DBM-species.

Example 3

Preparation of DBM-Based Catalyst at High Slurry Concentration

To a four-necked, 1 L flask equipped with a stir bar, a septum, a gas inlet, an addition funnel, and a thermometer was added DEAC (120.6 g, 0.25 mol). The solution was placed in a water bath and was rapidly stirred. Neat 2-Et-hexanol (65.11 g, 0.5 mol) was added to the solution dropwise via the addition funnel. Gas evolution and the formation of white smoke was observed. The solution temperature rapidly rose to 40° C. The addition took a total of 80 minutes.

A five-neck, 1 L flask was equipped with a 125 mL addition funnel, a thermometer, a mechanical stirrer with a Teflon paddle, a condenser with a gas inlet, and a septum. To the flask was added DBM (96.26 g, 0.135 mol) followed by DIAE (11.08 g, 0.07 mol). The agitation in the flask was set to 200 rpm. After 2 h, the DEAC/2-Et-Hexanol solution was added in 125 mL portions to the addition funnel of the five-necked flask and the solution was added dropwise to the DBM/DIAE mixture. The rate was set at ca. 1 drop/sec. After 40 mL of the DEAC/2-Et-hexanol solution was added, the clear DBM/DIAE solution grew cloudy with the formation of a fine white precipitate. At this point the rate of the addition was increased to 2 drops/sec. Precipitation was fast and the solution grew quite cloudy. Temperature increased from 24° C. to 30° C.° C. upon DECA/2-Et-hexanol addition. The addition was complete in 90 minutes at which time the solution had a colliodal appearance. The addition funnel was rinsed with heptane (100 mL) and the solution was allowed to stir for 1 h at room temperature.

The solution was next gradually heated to reflux (98° C.) over the course of 30 minutes. Over time, the solution grew much more viscous as much white solid was seen to form. After this time, the heat was lowered-to 75° C. The agitation was discontinued and the solution was allowed to stand overnight. Here settling was somewhat slow (15 minutes).

After 14 hours, the heat was lowered to 50° C. and the clear supernatant was decanted from the white solid. The solid was suspended in 375 mL of heptane. The solution was stirred at 200 rpm for 10 minutes. The agitation was discontinued and the solution was allowed to settle. The settling took 10 minutes. The cloudy supernatant was decanted and the white solid was slurried in heptane (250 mL). The washing procedure was repeated a total of 4 times. After washing, the solid was suspended in heptane (250 mL) and the solution was allowed to cool to room temperature.

A solution of $TiCl_4$ (33 mL, 300 mmol) diluted with heptane (100 mL total solution volume) was added to the addition funnel of the five-necked, 1 L flask. The $TiCl_4$ was added at a rate of about 0.25 drops/sec. After 30 minutes, the rate was increased to 1 drop/sec. The slurry took on a slight grey color upon $TiCl_4$ addition. Addition was completed in 135 min. The addition funnel was rinsed with heptane (2×50 mL) and the reaction was allowed to stir for one hour at room temperature. After this time, the mixture was slowly heated to 50° C. Over time, the solution grew slightly darker. After 1h, the temperature was increased to 98° C. After 40 min., the solution darkened to a brown color and appeared to thicken.

After 2 h, the temperature was lowered to 50° C. and agitation was discontinued. Settling of the solid was very rapid (less than 3 min.). The sample was washed four times as described above and the resultant brown solid was suspended in heptane (250 mL). A slurry sample was taken. The solvent was decanted and the solid was dried at 50° C. to afford 16.2 g of a light tan powder.

Example 4
Preparation of BEM-Based Catalyst at High Concentration

The exact procedure employed in the preparation of the DBM-Based Catalyst described above was performed except that BEM was used in place of DBM in the synthesis. The observations for both reactions were similar. The settling of the BEM-based catalyst catalyst was slightly faster than the settling of the DBM-species.

Example 5
TEAl Preactivation of BEM-Based Catalyst

The BEM-based catalyst prepared as described for Example 2, but on a 5 L scale was preactivated with TEAl. Here the final catalyst after washing was treated with a solution of TEAl (4.85 g of solution, 10.5 mmol) diluted with heptane (250 mL). The TEAl was added dropwise to the slurry over the course of 30 min. The solution darkened rapidly upon TEAl addition and eventually turned a brown-black color. After allowing the solution to stir for 1 h at room temperature, the catalyst was washed with heptane (4×500 mL). The catalyst was suspended in heptane and a final slurry sample was taken.

Example 6
TIBAl Preactivation of BEM-Based Catalyst

The catalyst of Example 2, prepared as described above, was treated with TIBAl (4.2 g solution, 5.3 mmol). The TIBAl solution was added dropwise to the slurry over the course of 30 minutes. The solution rapidly darkened upon TIBAl addition. The mixture was allowed to react at room temperature for 1 h after which time a sample was taken.

Example 7
Prepolymerization of TIBAl-Preactivated BEM-Based Catalyst

A small amount of TEAl (4.2 g, 9.1 mmol) was added to a portion of the catalyst prepared in Example 6 that contained approximately 15 g of catalyst. The slurry was cannula transferred into the 1 L Buchi reactor. The Buchi was filled to approximately 500 mL with heptane and the reactor temperature was set to 40° C. Agitation was set at 600 rpm. A 2 g/g prepolymerization was targeted. Ethylene was charged into the reactor at a rate of 40 mL/min for 15 minutes, then 1.5 bar of $H_2$ was added to the reactor. The ethylene feed was continued at a rate of 40 mL/min for 15 minutes. The solution grew lighter as time progressed. The ethylene rate was then increased to 100 mL/min. This rate was maintained for 3.8 h. A sample of light brown catalyst was taken at this point. Ashing analysis of the dried catalyst sample shows the prepolymerization to be approximately 1.73 g/g.

While the illustrative embodiments of the invention have been described with particularity, it will be understood that various other modifications will be apparent to and can be readily made by those skilled in the art without departing from the scope of the invention. Accordingly, it is not intended that the scope of the claims appended hereto be limited to the examples and descriptions set forth herein but rather that the claims be construed as encompassing all the features of patentable novelty which reside in the present invention, including all features which would be treated as equivalents thereof by those skilled the art to which this invention pertains.

What is claimed is:

1. A polymerization process comprising:
   providing a Ziegler-Natta type catalyst;
   contacting the catalyst with olefin monomer to form a prepolymerized catalyst; and
   contacting the prepolymerized catalyst with olefin monomer under polymerization reaction conditions to produce polymer fluff particles;
   wherein less than 5% of the polymer fluff particles are 700 microns or less in size.

2. The process of claim 1 wherein the prepolymerized catalyst is capable of producing a reduced number of polymer fluff fines than the Ziegler-Natta type catalyst.

3. The process of claim 1 wherein the prepolymerized catalyst produces at least 50% fewer polymer fluff fines as compared to the Ziegler-Natta type catalyst.

4. The process of claim 1 wherein the number of polymer fines produced is less than 0.5%.

5. A process for altering a Ziegler-Natta type catalyst particle size comprising:
- preparing a Ziegler-Natta type catalyst using a magnesium precursor solution having a magnesium solution concentration;
- wherein the catalyst particle size increases with an increase in magnesium solution concenfration; and
- wherein contacting the catalyst with olefin monomer to form a prepolymerized catalyst, and then contacting the prepolymerized catalyst with olefin monomer under polymerization reaction conditions to produce polymer fluff particles results in a polymer fluff wherein less than 5% of the polymer fluff particles are 700 microns or less in size.

6. The process of claim 5, wherein the Ziegler-Natta type catalyst is made using a magnesium precursor chosen from the group consisting of dibutylmagnesium and butylethylmagnesium.

7. The process of claim 5, wherein the resulting catalyst particle size is increased from between about 3 to about 10% for each solution concentration multiple that is utilized, when the solution concentration ranges are between about 10 mmol Mg/L to about 250 mmol Mg/L.

8. A polymerization process comprising:
- preparing a Ziegler-Natta type catalyst using a magnesium precursor solution having a magnesium solution concentration, wherein the catalyst particle size increases with an increase in magnesium solution concentration; and
- contacting the catalyst with olefin monomer under polymerization reaction conditions to produce polymer fluff particles wherein less than 5% of the polymer fluff particles are 700 microns or less in size.

9. The process of claim 8 further comprising:
- contacting the catalyst with olefin monomer to form a prepolymerized catalyst.

10. The process of claim 8 wherein the number of polymer fluff particles less than 125 microns decreases with an increase in magnesium solution concentration.

11. A polymerization process comprising:
- providing a Ziegler-Natta type catalyst;
- contacting the Ziegler-Natta type catalyst with triisobutylaluminum to form a precontacted catalyst;
- contacting the precontacted catalyst with olefin monomer to form a prepolymerized catalyst; and
- contacting the prepolymerized catalyst with olefin monomer under polymerization reaction conditions to produce polymer fluff particles;
- wherein the precontacted catalyst is at least 20% larger in average particle size than the Ziegler-Natta type catalyst;
- wherein the prepolymerized catalyst has at least 50% fewer particles with a size of 40 microns or less than the precontacted catalyst;
- wherein less than 5% of the polymer fluff particles are 700 microns or less in size; and wherein the number of polymer fines produced is less than 0.5%.

* * * * *